June 2, 1936.  A. H. BLOUNT  2,042,581
FOOD AND FOOD PACKAGING
Filed Aug. 2, 1934
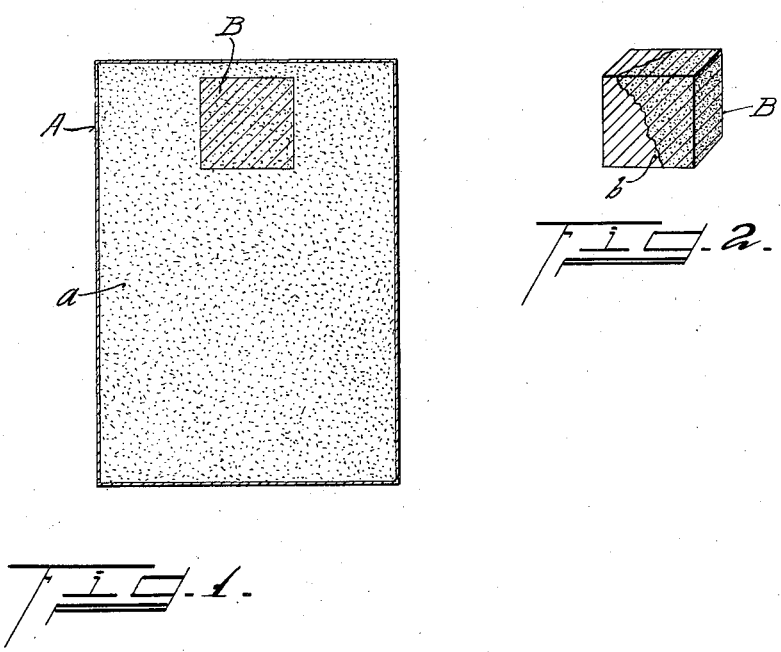
INVENTOR:
Alvin H. Blount,
BY
ATTORNEY

UNITED STATES PATENT OFFICE 2,042,581

FOOD AND FOOD PACKAGING

Alvin H. Blount, Los Angeles, Calif., assignor to Jell-Well Dessert Company, Ltd., Vernon, Calif., a corporation of California Application August 2, 1934, Serial No. 738,149

2 Claims. (Cl. 99—129)

This invention relates to improvements in foods and food packaging; and it has for its objects to provide a food preparation or food preparations or ingredients or elements, and likewise preferably to package same in a common container, to the end that the virtues and properties of the ingredients or elements or food constituents may be conserved and protected from loss or dissipation, so that the final mixed alimentary product may be greatly improved in character from the standpoint of such conservation, and otherwise of proper texture, admixture and general fineness and acceptability.

More particularly does my present invention relate to gelatinous desserts which are ordinarily dispensed with coloring and flavoring matter, which latter are ordinarily distributed throughout the mass of the dessert material. In accordance with present practice, it results that the flavoring material, so distributed throughout the gelatinous particles or granules, is very much dissipated and lost, however carefully the dessert preparation may be packaged. Ordinarily, the preparation is put up in paper boxes, being immediately contained in paper wrappings or bags inserted within such boxes, to a total weight of three or four ounces. When these desserts so packaged are stored, or displayed upon store counters and shelves, the flavoring material quite rapidly passes out from the gelatinous particles and is lost, so that when the preparation is mixed with water and allowed to cool in a jelly-like mass, in which form it is consumed, the flavoring has very largely departed from the preparation.

Ordinarily, such preparations comprise or include gelatine, sugar, flavoring and coloring materials. These are mechanically mixed together and the mixture sacked and then packed in paper boxes, as above stated.

In accordance with the practice of the present invention, no change is made whatsoever with respect to the formula of ingredients for the gelatinous dessert, and nothing is added to or substracted therefrom, in toto. The present improvements concern only the initial assembly of the flavoring and coloring materials and sugar or saccharine with the gelatinous particles, and any other ingredients, and the method of incorporating the latter into the mass of gelatinous particles and balance of sugar and such other ingredients, such flavoring and coloring and some sugar being preferably associated together and provided in a single unit or a plurality of units in the mass of gelatinous and other particles in each package, the entire contents being melted down when mixed with hot water, and brought to a homogeneous mixture of the elements and constituents; and this being done, preparatory to "jellying" and then serving the dessert, the flavoring material is conserved and of greatly increased potency when the dessert is consumed. Prior to such melting down of the ingredients of the dessert, such flavoring material, with the coloring material, is preferably locked up in a cube or mass of sugar, and this unit is placed within the mass of materials making up the balance of the dessert formula in the package, so that as the contents of the package are poured out it is all ready for subjection to the melting down process conjointly with the remaining materials. It will readily be understood that flavoring material so imprisoned in this cube will have far less chance of evaporating and being lost than if it were spread throughout an entire mass of granular dessert material. However, to further prevent evaporation and more effectively imprison the flavoring material, the outside of the cubes may be hardened by passing them through quick high temperatures, a process known as "case hardening", or, perhaps preferably, the cubes so impregnated with coloring and flavoring material may be dipped in a sugar syrup so prepared that the cubes so dipped will be covered with a thin hard skin or coating having a tendency to further seal in the flavoring against evaporation.

In accordance with present practice, all of the dry ingredients except the gelatine are first mixed together, and when so mixed the liquid coloring and flavoring material are added. This produces a "damp" mass, and further mixing gradually dries it back into fine granulated form. Just before this mix is thoroughly dry, but dry enough not to harm the gelatine, this latter ingredient is added, and by the time it becomes evenly distributed in the mass and homogeneously mixed together with it, the total mix is completed and ready for discharge into storage containers where it is kept a day or two for further drying before being dumped into the hoppers of the packaging machines. So prepared, each grain of fine granulated sugar gets its quota of coloring and flavoring material, but a considerable amount of this flavoring is lost through evaporation. First, evaporation takes place in the mixing process, and, second, while the material is stored before packaging, and, third, during the indefinite time that the packaged product remains in the package before being dissolved by the customer for consumption.

We have determined that gelatinous desserts made in accordance with this process have a much stronger and finer fruit or other flavor when not over twenty-four to forty-eight hours old, or after the mixing of all the ingredients takes place, than does such dessert preparation having an age of a week or more. This "fading" of the flavor is most pronounced during the first week or so after the preparation has been compounded, and is far less in degree from that time on.

In arriving at a solution of this problem, which is produced by the practice of the present invention, I experimented with hard cubes of table sugar, which I soaked with the requisite amount of flavor and color for a given package. On testing these samples after they had been exposed to the air for three weeks, against samples of the regular gelatinous dessert mix of exactly the same age, I found a distinctly better flavor from the cubes so treated.

In practicing the invention to produce a package of three and one-quarter ounce weight, I make up a mix of the proper amount of sugar and flavoring (and coloring matter) so that approximately one-fourth ounce of sugar (the weight of the finished cube) will contain the right amount of flavoring and coloring material for one package of the gelatinous dessert. From this mix of sugar and flavoring and coloring material, cubes are compressed in a machine and dried sufficiently so that they will be of sufficient hardness to retain their form when packed loose in a package containing a gelatinous material and any other ingredients mixed therewith. These cubes need not necessarily be made as hard as cubes of pure table sugar, and as much moisture may be permitted to remain therein as will fall short of causing the cubes to crumble. These cubes are then either "case hardened" or provided with a hard skin or coating in the manner above set forth, and are then ready to be introduced into the mix of gelatine and any other material or ingredients utilized in the mix. The correct amount of flavoring and coloring material for each package will now be provided in one cube of sugar; or, if preferable, a plurality of such cubes might be used. Possibly a ball of sugar or sugar in some other geometric form might be preferable. The final dessert preparation then will consist of a standard dry mix consisting of gelatine and the same quantity of granulated sugar as used in present practice, less, of course, the amount of sugar already provided in the cube above described, together with any other ingredients desired. When the proper amount of this plain or general mix, devoid of any coloring or flavoring material, has been weighed into each package, one or more sugar cubes or units in which are incorporated flavoring and coloring material as above set forth, as lumps, are dropped loosely in place in the mix either by hand or machinery before the package is sealed, and such cube will definitely seal and contain and conserve within itself such flavoring material, particularly when "case hardened" or provided with a surface skin or coating as above set forth.

It may also be preferable, under certain circumstances, to dip cubes of sugar or saccharine material into a solution of flavoring material and coloring material and thus impregnate such cubes with such materials by absorption. The same action will take place upon the dissolving of such cubes or masses, and the distribution of the coloring matter indicating the distribution of the flavoring matter.

Many advantages flow from this new method of putting up, packaging and combining the ingredients of an alimentary mixture such as a gelatinous dessert. When the hot water is added to the standard mix and the sugar cube extracted from the package, the mixture will be perfectly clear until the flavor cube starts to dissolve, and, when that commences, the person stirring the mixture will be able to observe the dissolving of the cube, but the proper amount and distribution of color will not be complete until the mixture has all been thoroughly dissolved; and in this way the consumer is more certain to thoroughly mix up the ingredients and get a proper homogeneous distribution of all the elements and qualities and constituents. The coloring matter thus serves as an indicator or guide for mixing.

As the gelatine in the mix is not in contact with any moisture, the evils of caking thereof in the package which are present in practices now obtaining, will be eliminated; and all of the flavoring will be thoroughly contained and imprisoned and locked within the sugar cubes or cube or other sugar units so that evaporation will be very largely eliminated.

Another advantage is that the contents of the package other than the cube which can be readily removed, can be used as a plain gelatine mix for salad purposes, in which use no flavoring is desired.

In accordance with the present invention, a standardized mix of gelatine and part of the sugar and other dry materials is provided for, and the providing of the separate coloring and flavoring materials in the cubes for packaging with such standardized mix, produces facility and economy in practice of great advantage, and tends to a simplification in manufacture with a resultant saving.

These improvements in dessert and other alimentary products and the packaging of same introduced a radically new practice into such art, and greatly add to the attractiveness and desirability of the product, particularly inasmuch as the consumer is able to thoroughly gauge the mixing and melting process, as to homogeneous distribution, and likewise welcomes the enhanced and conserved flavor, which, in fine, lends the product its principal attractiveness and desirability.

In the drawing, Fig. 1 is a vertical section of a box or package containing a gelatinous dessert prepared and packed in accordance with my invention, the plain or standard mix being shown distributed throughout the package, and surrounding a cubical unit of sugar containing coloring and flavoring materials; and, Fig. 2 is a perspective view of the cubical unit of sugar shown in Fig. 1, in detached position, and with a coating of hardened sugar syrup partly covering the cube and broken away at other portions.

As above pointed out, the standard mix is discharged into the package and the cubical sugar unit, with coloring and flavoring material, then dropped into the batch of dry mix and the package is then closed or sealed up.

The drawing discloses a conventional form of package without any particular reference to specific practice in this art.

In the drawing, A is the box or package or container, B is the cubical sugar unit with the flavoring and coloring material, and $b$ is the coating of hardened sugar syrup. The standard mix is shown at $a$.

It is obvious that many changes may be made in departure and variation from the disclosure and the drawing, in practicing my invention and in adapting it to various kinds of aliments or desserts, and in adapting the invention to various conditions of service and practice and use, without departing from the true spirit of the invention.

Having thus disclosed my invention, I claim and desire to secure by Letters Patent:

1. The combination with a soluble food product, of a flavoring carrier consisting of a solid preformed porous body of saccharine material impregnated with a volatile flavoring and coloring material soluble with the food product, and said body having a surface of hardened saccharine material formed thereon impervious to the escape of the volatile flavoring material.

2. A flavoring material carrier consisting of a preformed solid porous body formed of sugar and impregnated with a volatile flavoring material, and said body having a sealing surface of hardened saccharine material formed thereon impervious to the escape of the volatile flavoring material.

ALVIN H. BLOUNT.